United States Patent
Ljung et al.

(10) Patent No.: US 11,950,291 B2
(45) Date of Patent: Apr. 2, 2024

(54) SYSTEM AND METHOD FOR RANDOM ACCESS CHANNEL (RACH) PROCEDURE CONFIGURATION

(71) Applicant: Sony Corporation, Tokyo (JP)

(72) Inventors: Rickard Ljung, Lund (SE); Anders Berggren, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 464 days.

(21) Appl. No.: 17/272,446

(22) PCT Filed: Sep. 17, 2019

(86) PCT No.: PCT/US2019/051407
§ 371 (c)(1),
(2) Date: Mar. 1, 2021

(87) PCT Pub. No.: WO2020/068478
PCT Pub. Date: Apr. 2, 2020

(65) Prior Publication Data
US 2021/0329705 A1   Oct. 21, 2021

(30) Foreign Application Priority Data
Sep. 28, 2018   (SE) .................................. 1830270-3

(51) Int. Cl.
*H04W 74/08* (2009.01)
*H04W 16/14* (2009.01)
*H04W 74/0833* (2024.01)
*H04W 76/10* (2018.01)

(52) U.S. Cl.
CPC ....... *H04W 74/0833* (2013.01); *H04W 16/14* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2017/0156158 A1 | 6/2017 | Harris | |
| 2018/0110074 A1* | 4/2018 | Akkarakaran | ........ H04W 72/21 |
| 2018/0139778 A1 | 5/2018 | Chou | |
| 2019/0014512 A1* | 1/2019 | Rune | ..................... H04W 36/08 |

(Continued)

FOREIGN PATENT DOCUMENTS

| | | |
|---|---|---|
| WO | 2017/151187 A1 | 9/2017 |
| WO | 2018/127487 A1 | 7/2018 |
| WO | WO-2018174577 A1 | 9/2018 |

OTHER PUBLICATIONS

International Search Report and Written Opinion from corresponding International Application No. PCT/US2019/051407, dated Jan. 23, 2020, 21 pages.

(Continued)

*Primary Examiner* — Anh Ngoc M Nguyen
(74) *Attorney, Agent, or Firm* — Tucker Ellis LLP

(57) ABSTRACT

Configuring a random access channel (RACH) procedure in a wireless communication network may include selecting one of plural RACH procedure configurations for a radio communication device to employ to initiate access with the wireless communication network and communicating the selected RACH procedure configuration to the radio communication device.

18 Claims, 3 Drawing Sheets

(56) References Cited

U.S. PATENT DOCUMENTS

| | | | |
|---|---|---|---|
| 2019/0230562 A1* | 7/2019 | Fan | H04W 24/08 |
| 2019/0230715 A1* | 7/2019 | Christoffersson | H04W 72/23 |
| 2019/0327663 A1* | 10/2019 | Wirth | H04W 48/02 |
| 2020/0015266 A1* | 1/2020 | Yan | H04W 74/0833 |
| 2020/0163076 A1* | 5/2020 | Liu | H04W 72/02 |
| 2020/0163128 A1* | 5/2020 | Pang | H04W 72/0453 |
| 2021/0195584 A1* | 6/2021 | You | H04L 5/0091 |
| 2022/0086774 A1* | 3/2022 | Qian | H04W 72/0446 |

OTHER PUBLICATIONS

Zte, et al., "Considerations on channel access procedure for NR-U," 3GPP TSG RAN WG2 Meeting #101bis, R2-1804349, Apr. 16-20, 2018, 4 pages.

Ericsson, "[99bis#53][MTC/NB-IoT] EDT indication via PRACH," 3GPP TSG-RAN WG2 #100, R2-1713057, Nov. 27, 2017-Dec. 1, 2017, 30 pages.

Search Report and Office Action from corresponding Swedish Application No. 1830270-3, dated Apr. 15, 2019, 20 pages.

Zte, "Considerations on channel access procedure for NR-U," 3GPP TSG RAN WG2 NR #103 Meeting, R2-1811281, Aug. 20-24, 2018, 4 pages.

InterDigital Communications, "Random Access Procedure in NR," 3GPP TSG-RAN WG2 #96, R2-168465, Nov. 14-18, 2016, 3 pages.

* cited by examiner

SYSTEM AND METHOD FOR RANDOM ACCESS CHANNEL (RACH) PROCEDURE CONFIGURATION

TECHNICAL FIELD OF THE INVENTION

The technology of the present disclosure relates generally to cellular network operation and, more particularly, to a system and method for configuring and carrying out random access channel (RACH) procedures between a network access node and a radio communication device.

BACKGROUND

In Third Generation Partnership Project (3GPP) systems, a user equipment (UE) needs to synchronize to and access the network at various times, such as at initial access when returning from idle mode, during handover, and other situations. For this purpose, the UE initiates a random access channel (RACH) procedure with a base station (BS). The RACH procedure in legacy 3GPP systems, such as wideband code division multiple access (WCDMA) and long-term evolution (LTE), is set by relevant standards. Specifically, the RACH procedure is fixed in terms of a set of predefined messages that are transmitted in preconfigured RACH resources.

The messages of the RACH procedure commences with the UE sending a physical random access channel (PRACH) preamble message (often referred to as a preamble message, or as message 1 or msg1) to the base station. The base station responds with a random access response (RAR) message, which is often referred to as message 2 or msg2. Then, the UE sends a radio resource control (RRC) connection (or resume) request message, often referred to as message 3 or msg3, to which the base station responds with an RRC connection setup message, often referred to as message 4 or msg4.

As radio communications standards evolve, there have been proposals to change the way the RACH procedure is implemented. For instance, in 5G proposals for future potential versions of the specification of new radio (NR), the UE may be configured to operate in unlicensed spectrum bands that might support a different RACH procedure than previously used in legacy 3GPP systems. At the 3GPP TSG RAN WG2 NR #103 Meeting (documented at R2-1811281), several RACH procedure options were discussed to take into account the use of multiple sub-bands within a total allocated amount of frequency resources. This is often referred to as the use of multiple bandwidth parts (BWPs). In NR unlicensed operation, each BWP may be 20 MHz wide or may be of some other bandwidth. In one proposal, for a UE that has been configured with multiple available BWPs, the RACH procedure may be initiated by the UE (e.g., by sending message 1) in any one of the BWPs and the remaining RACH procedure messages (messages 2 through 4) are sent in the same BWP. In this case, the UE may not send additional preamble messages in other BWPs. In another proposal, the RACH procedure messages sent by the UE are sent in one BWP and the network response messages are send in another of the BWPs. In another proposal, the UE may send the preamble message in multiple BWPs and the remainder of the RACH procedure is carried out in one of the BWPs. In still another proposal, the complete RACH procedure is carried out in two or more BWPs.

Another proposal is to move from a four step RACH procedure to a two-step RACH methodology. In this proposal, the RACH procedure messages and message handling are combined. More specifically, the UE would send one uplink message that combines the information of messages 1 and 3. The response from the base station would combine the information of messages 2 and 4 in a single downlink message.

SUMMARY

According to some aspects of the disclosure, a coordinated approach to configuring the RACH procedure is carried out between a UE and a base station of a radio access network. This may improve the delivery of services to the UE by providing more than one option for the RACH procedure configuration.

According to one aspect of the disclosure, a method of random access channel (RACH) procedure configuration in a wireless communication network includes: selecting one or more of plural RACH procedure configurations for a radio communication device to employ in order to initiate access with the wireless communication network; and communicating the selected RACH procedure configuration to the radio communication device.

According to another aspect of the disclosure, a method of conducting a random access channel (RACH) procedure in a wireless communication network includes: transmitting a RACH procedure message from one of a radio communication device or a network access node to the other of the radio communication device or the network access node over a first bandwidth part; and transmitting an early data transmission message from the one of the radio communication device or the network access node to the other of the radio communication device or the network access node over a second bandwidth part different from the first bandwidth part, the early data transmission message transmitted in association with the RACH procedure message.

According to another aspect of the disclosure, a method of conducting a random access channel (RACH) procedure in a wireless communication network includes: conducting a first RACH procedure in a first bandwidth part, the conducting of the first RACH procedure including transmitting a message of the first RACH procedure appended with a first portion of early data transmission (EDT) data; and conducting a second RACH procedure in a second bandwidth part different than the first bandwidth part, the conducting of the second RACH procedure including transmitting a message of the second RACH procedure appended with a second portion of the EDT data, the first and second portions of the EDT data being logically associated for reconstruction by a device receiving the corresponding messages of the first and second RACH procedures.

According to another aspect of the disclosure, a method of conducting a random access channel (RACH) procedure in a wireless communication network includes: receiving a physical random access channel (PRACH) preamble message from a radio communication device over a first bandwidth part; prior to responding to the PRACH preamble message, receiving a radio resource control (RRC) connect request message transmitted by the radio communication device over a second bandwidth part different from the first bandwidth part; and responding to the PRACH preamble message and the RRC connect request message by transmitting a RACH response on one of the first or second bandwidth part and an RRC connection setup message on one of the first or second bandwidth part.

According to another aspect of the disclosure, a network access node in a wireless communication network, the network access node configured to configure a random access channel (RACH) procedure for a radio communication device and including: a wireless interface over which communications with the radio communication device are carried out; and a control circuit configured to: select one or more of plural RACH procedure configurations for the radio communication device to employ in order to initiate access with the wireless communication network; and communicate the selected RACH to procedure configuration to the radio communication device using the wireless interface.

According to another aspect of the disclosure, a network access node in a wireless communication network, the network access node including: a wireless interface over which communications with a radio communication device are carried out; and a control circuit configured to control the wireless interface to: transmit a RACH procedure message to the radio communication device over a first bandwidth part; and transmit an early data transmission message to the radio communication device over a second bandwidth part different from the first bandwidth part, the early data transmission message transmitted in association with the RACH procedure message.

According to another aspect of the disclosure, a network access node in a wireless communication network, the network access node including: a wireless interface over which communications with a radio communication device are carried out, including: receive a physical random access channel (PRACH) preamble message from the radio communication device over a first bandwidth part; and prior to the network access node responding to the PRACH preamble message, receive a radio resource control (RRC) connect request message transmitted by the radio communication device over a second bandwidth part different from the first bandwidth part; and a control circuit configured to respond to the PRACH preamble message and the RRC connect request message by controlling the wireless interface to transmit a RACH response on one of the first or second bandwidth part and an RRC connection setup message on one of the first or second bandwidth part.

According to another aspect of the disclosure, a method of random access channel (RACH) procedure configuration in a radio communication device that is configured to communicate with a wireless communication network, including: transmitting a RACH configuration request for a preferred RACH procedure configuration to a network access node of the wireless communication network; receiving a RACH configuration message from the network access node in response to the RACH configuration request, the RACH configuration message containing a RACH procedure configuration selected by the network access node; and initiating access with the wireless communication network by transmitting a first RACH procedure message consistent with the RACH procedure configuration to the network access node.

According to another aspect of the disclosure, a method of conducting a random access channel (RACH) procedure in a radio communication device that is configured to communicate with a wireless communication network, including: transmitting a physical random access channel (PRACH) preamble message over a first bandwidth part; prior to receiving a response to the PRACH preamble message from a network access node, transmitting a radio resource control (RRC) connect request message over a second bandwidth part different from the first bandwidth part; and receiving a RACH response on one of the first or second bandwidth part and an RRC connection setup message on one of the first or second bandwidth part.

According to another aspect of the disclosure, a radio communication device in a wireless communication network that includes a network access node configured to configure a random access channel (RACH) procedure for the radio communication device, the radio communication device including: a wireless interface over which communications with the network access node are carried out; and a control circuit configured to control the wireless interface to: transmit a RACH configuration request for a preferred RACH procedure configuration to the network access node; receive a RACH configuration message from the network access node in response to the RACH configuration request, the RACH configuration message containing a RACH procedure configuration selected by the network access node; and initiate access with the wireless communication network by transmitting a first RACH procedure message consistent with the RACH procedure configuration to the network access node.

According to another aspect of the disclosure, a radio communication device in a wireless communication network that includes a network access node, the radio communication device including: a wireless interface over which communications with the network access node are carried out; and a control circuit configured to control the wireless interface to: transmit a RACH procedure message from the radio communication device to the network access node over a first bandwidth part; and transmit an early data transmission message from the radio communication device to the network access node over a second bandwidth part different from the first bandwidth part, the early data transmission message transmitted in association with the RACH procedure message.

According to another aspect of the disclosure, a radio communication device in a wireless communication network that includes a network access node, the radio communication device including: a wireless interface over which communications with the network access node are carried out; and a control circuit configured to control the wireless interface to: transmit a physical random access channel (PRACH) preamble message over a first bandwidth part; prior to receiving a response to the PRACH preamble message from the network access node, transmit a radio resource control (RRC) connect request message over a second bandwidth part different from the first bandwidth part; and receive a RACH response on one of the first or second bandwidth part and an RRC connection setup message on one of the first or second bandwidth part.

DETAILED DESCRIPTION OF EMBODIMENTS

Figure 1:
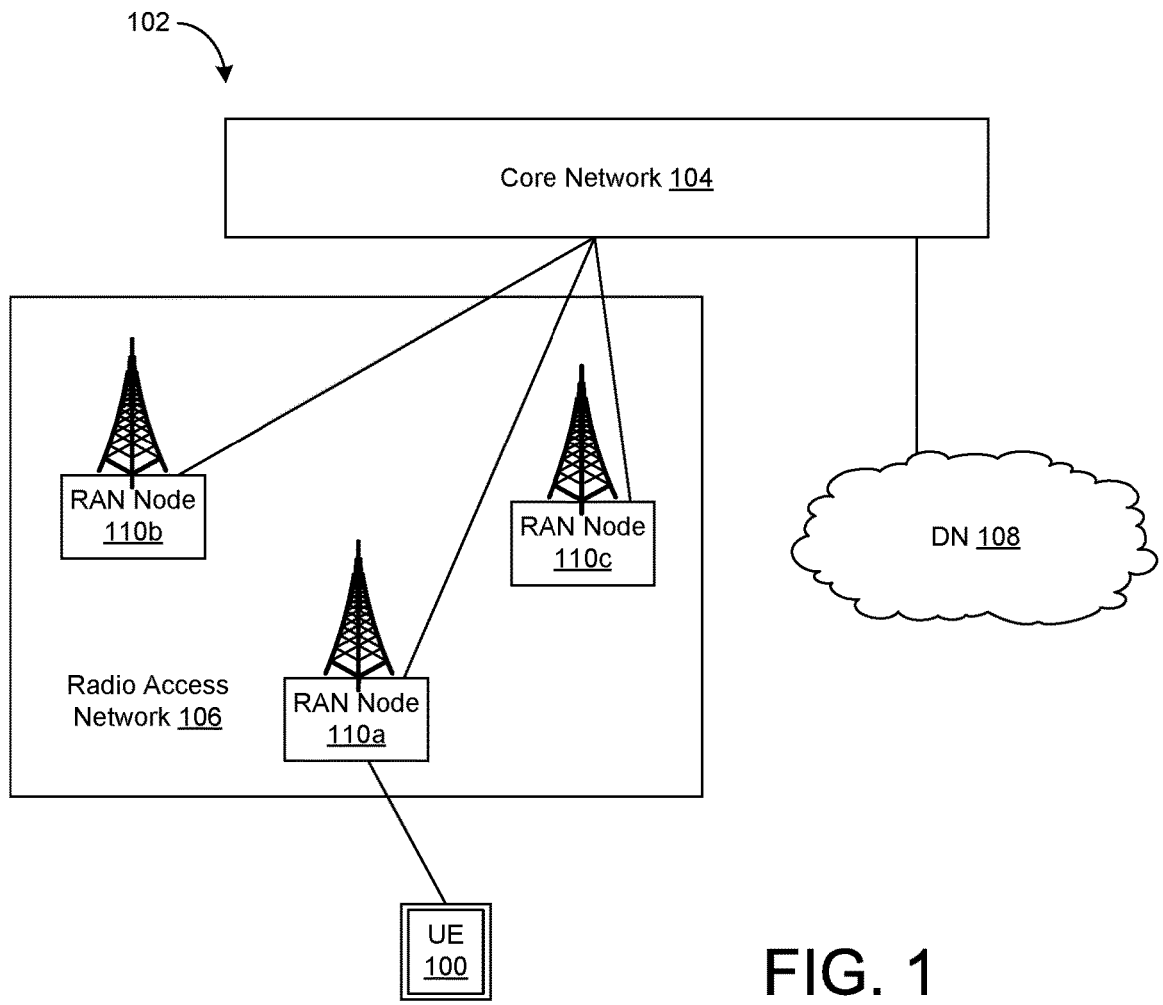
FIG. 1 is a schematic block diagram of a representative operational network environment for a radio communication device, also referred to as a user equipment.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

System Architecture

FIG. 1 is a schematic diagram of an exemplary network environment in which the disclosed techniques are implemented. It will be appreciated that the illustrated network environment is representative and other environments or systems may be used to implement the disclosed techniques. Also, various network functions may be carried out by a single device, such as by a radio access node, or may be carried out in a distributed manner across nodes of a computing environment.

The network environment is relative to an electronic device, such a user equipment (UE) 100. As contemplated by 3GPP standards, the UE may be a mobile radiotelephone (a "smartphone"). Other exemplary types of UEs 100 include, but are not limited to, a gaming device, a media player, a tablet computing device, a computer, and an internet of things (IoT) device. Since aspects of the disclosed techniques may be applicable to non-3GPP networks, the UE 100 may be more generically referred to as a wireless communications device or a radio communication device.

The network environment includes a wireless communication network 102 that may be configured in accordance with one or more 3GPP standards, such as a 3G network, a 4G network or a 5G network. The disclosed approaches may apply to other types of networks. In one embodiment, the network 102 operates using licensed spectrum for which the operator of the network 102 has acquired appropriate rights. In other embodiments, the network 102 operates using unlicensed spectrum that may be shared with other radio devices and networks that may, for example, be controlled by different operators. In another embodiment, the network 102 operates using both licensed and unlicensed spectrum, such as contemplated by 3GPP TR 23.791: Study of Enablers for Network Automation for 5G, commonly referred to as "Release 16."

In unlicensed spectrum bands, the radio devices in the network 102 adhere to listen before talk (LBT) protocols or any other specified protocols depending on the rules promulgated by the appropriate regulatory authority so as to reduce the possibility of interference with other users. Therefore, in instances where communications described in this disclosure document occur in unlicensed spectrum, LBT or other required actions are assumed to be carried out prior to transmissions even though not described.

In instances where the network 102 is a 3GPP network, the network 102 includes a core network (CN) 104 and a radio access network (RAN) 106. The core network 104 provides an interface to a data network (DN) 108. The DN 108 represents operator services, connection to the Internet, third party services, etc. Details of the core network 104 are omitted for simplicity of description, but it is understood that the core network 104 includes one or more servers that host a variety of network management functions, examples of which include, but are not limited to, a user plane function (UPF), a session management function (SMF), a core access and mobility management function (AMF), an authentication server function (AUSF), a network exposure function (NEF), a network repository function (NRF), a policy control function (PCF), a unified data management (UDM), an application function (AF), and a network slice selection function (NSSF).

The RAN 106 includes a plurality of RAN nodes 110. In the illustrated example, there are three RAN nodes 110a, 110b, and 110c. Fewer than or more than three RAN nodes 110 may be present. For 3GPP networks, each RAN node 110 may be a base station such as an evolved node B (eNB) base station or a 5G generation gNB base station. Since aspects of the disclosed techniques may be applicable to non-3GPP networks, the RAN nodes 110 may be more generically referred to as network access nodes, an alternative example of which is a WiFi access point.

A radio link may be established between the UE 100 and one of the RAN nodes 110 for providing wireless radio services to the UE 100. The RAN node 110 to which the radio link is established will be referred to as the servicing RAN node 110 or servicing base station. Other RAN nodes 110 may be within communication range of the UE 100. The RAN 106 is considered to have a user plane and a control plane. The control plane is implemented with radio resource control (RRC) signaling between the UE 100 and the RAN node 110. Another control plane between the UE 100 and the core network 104 may be present and implemented with non-access stratum (NAS) signaling.

Figure 2:
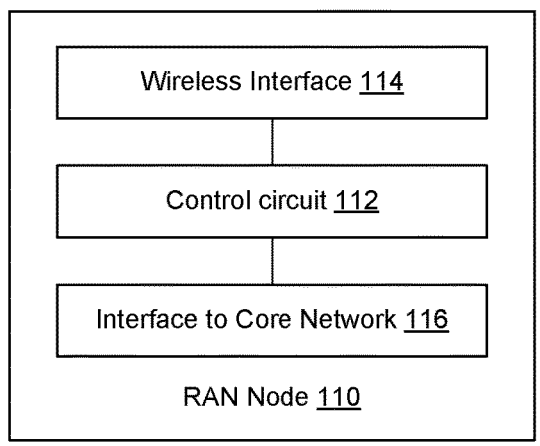
FIG. 2 is a schematic block diagram of a RAN node from the network environment.

With additional reference to FIG. 2, each RAN node 110 typically includes a control circuit 112 that is responsible for overall operation of the RAN node 110, including controlling the RAN node 110 to carry out the operations described in herein. In an exemplary embodiment, the control circuit may include a processor (e.g., a central processing unit (CPU), microcontroller, or microprocessor) that executes logical instructions (e.g., lines or code, software, etc.) that are stored by a memory (e.g., a non-transitory computer readable medium) of the control circuit 112 in order to carry out operation of the RAN node 110.

The RAN node 110 also includes a wireless interface 114, such as a radio transceiver, for establishing an over the air connection with the UE 100. The RAN node 110 also includes an interface 116 to the core network 104. The RAN node 110 also includes an interface (not shown) to one or more neighboring RAN nodes 110 for conducting network coordination in the RAN 106.

Figure 3:
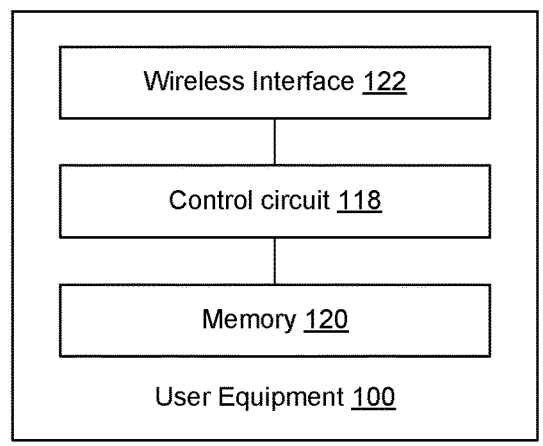
FIG. 3 is a schematic block diagram of the user equipment from the network environment.

With additional reference to FIG. 3, illustrated is a schematic block diagram of the UE 100. The UE 100 includes a control circuit 118 that is responsible for overall operation of the UE 100, including controlling the UE 100 to carry out the operations described herein. In an exemplary embodiment, the control circuit 118 may include a processor (e.g., a central processing unit (CPU), microcontroller, or microprocessor) that executes logical instructions (e.g., lines or code, software, etc.) that are stored by a memory (e.g., a non-transitory computer readable medium) of the control circuit 118 or a separate memory 120 in order to carry out operation of the UE 100.

The UE 100 includes a wireless interface 122, such as a radio transceiver, for establishing an over the air connection with the servicing base station 110. In some instances, the UE 100 may be powered by a rechargeable battery (not shown). Depending on the type of device, the UE 100 may include one or more other components. Other components may include, but are not limited to, sensors, displays, input components, output components, electrical connectors, etc.

Random Access Channel Procedure Configuration

Techniques will be described for configuring a random access channel (RACH) procedure for the UE 100. The RACH procedures for multiple UEs 100 may be configured in a similar manner. The configuring may be performed via dedicated or broadcasted control signaling transmissions or combinations thereof.

The disclosed techniques allow for one of plural RACH procedure configurations to be used by the UE 100. The RAN node 110 maintains control over which RACH procedure configuration is used by the UE 100. In one embodiment, the RAN node 110 selects which one of the plural RACH procedure configurations that is to be used by the UE 100. During the selection, the RAN node 110 may take one or more factors into account to improve performance of the communications between the UE 100 and the RAN node 110 and/or to manage congestion or other network conditions in the RAN 106. The factors may include, but are not limited to, conditions in the RAN 106, network service(s) used by the UE 100, UE device type, device capability information for the UE 100, and preferences of the UE 100. Therefore, for a UE 100 that has high performance demands, a RACH procedure configuration that supports low latency or high reliability may be selected. In other cases, such as for an IoT device that does not have high performance demands, a different RACH procedure configuration may be selected.

Configuring of the RACH procedure in the disclosed manner may be used for licensed spectrum, unlicensed spectrum or both licensed and unlicensed spectrum. Also, each of the plural RACH procedure configurations need not be established according to a standard protocol. Rather, the disclosed approach provides a uniform manner of selecting an appropriate RACH procedure configuration and communicating the selected RACH procedure configuration to the UE 100.

In one embodiment of carrying out steps to configure the RACH procedure to be used by the UE 100, the UE 100 has been powered on and has completed connection tasks to establish initial registration and/or communication with the RAN node 110. As part of the establishment of initial registration and/or communication, the UE 100 may perform a RACH procedure using a default configuration. Also, the configuring of the RACH procedure may be carried out multiple times during operation of the UE 100. Therefore, the configuring of the RACH procedure according the disclosed techniques may be considered reconfiguring of the RACH procedure. But, for ease of description, the disclosed techniques are described as configuring the RACH procedure.

Figure 4:
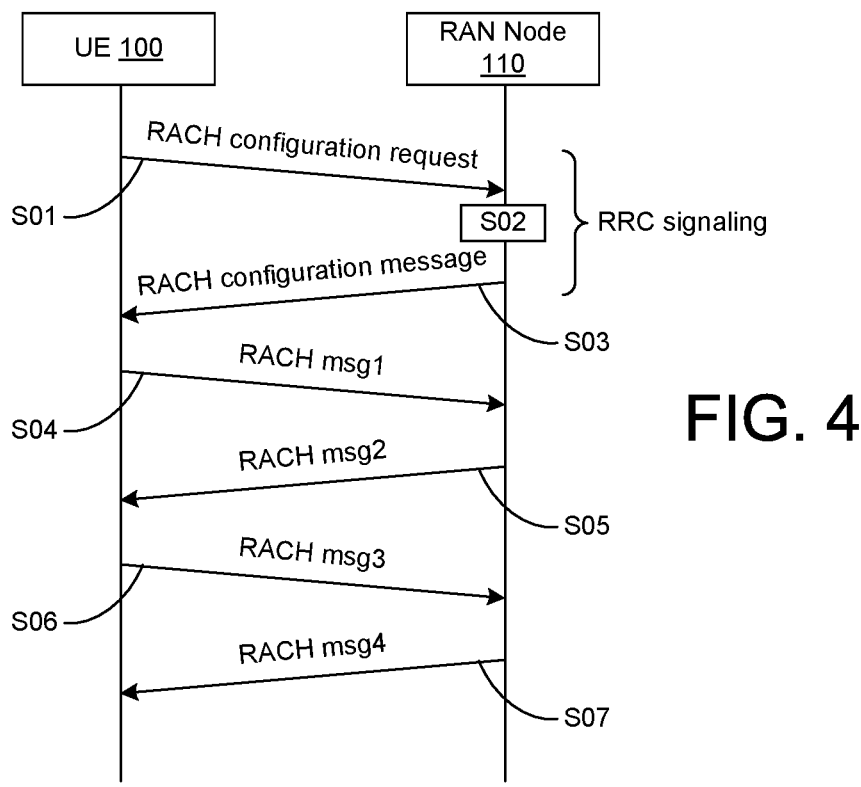
FIG. 4 is a first exemplary message flow diagram for communications between the user equipment and the RAN node.

With additional reference to FIG. 4, shown is an exemplary signaling diagram for messages that are sent between the UE 100 and the RAN node 110 to configure the RACH procedure used by the UE 100 and then to carry out a corresponding RACH procedure. It will be understood that the RACH procedure need not be carried out for the configuration of the RACH procedure to be completed. Also, once the RACH procedure is configured, multiple RACH procedures may be carried out using the RACH procedure configuration before the RACH procedure configuration is changed or the configuration process is repeated.

FIG. 4 may be considered to illustrate an exemplary process flow containing steps that may be collectively carried out by various components of the network 102. FIG. 4 also may be considered to illustrate exemplary process flows that each contain one or more steps carried out by respective individual components of the network 102. Although illustrated in a logical progression, the operations shown in FIG. 4 may be carried out in other orders and/or with concurrence between two or more operations. Therefore, the illustrated flow may be altered (including omitting steps) and/or may be implemented in other manners. The operations carried out by the various devices may be embodied in respective logical routines (e.g., software or lines of code) stored on non-transitory computer readable medium of the appropriate devices.

At step S01, the UE 100 transmits a RACH configuration request message to the RAN node 110 and this message is received by the RAN node 110. For step S01, the UE 100 may have at least an active RRC communication session with the RAN node 110. Therefore, the RACH configuration request message may be made using RRC signaling. In a typical implementation, the RACH configuration request message is part of RRC signaling used for additional purposes so that the UE 100 need not have to transmit a dedicated request. In other embodiments, a dedicated request is possible.

The RACH configuration request message may include information regarding the UE 100, such as type of device, device capabilities (e.g., supported frequency bands and data rates), type of services requested from the network 102 or the DN 108, and so forth. In many instances, the device type and device capabilities may have already been communicated to the network 102 during earlier configuration tasks and this information may be omitted from the RACH configuration request message. In one embodiment, the RACH configuration request message may include a preference regarding the RACH procedure configuration that will be assigned to the UE 100 by the RAN node 110. The preference may be specified in the form of a specific RACH procedure configuration or a category of RACH procedure configurations. Alternatively, the preference may be specified in the form of a request for a RACH procedure configuration to support a certain type of service (e.g., video streaming) and/or one or more communication parameters (e.g., priority, latency, reliability, or quality of service).

In response to receiving the RACH configuration request message from the UE 100, the RAN node 110 selects one of plural RACH procedure configurations for the UE 100 at step S02. The selection may be made based on, for example, a set of logical rules or based on a learning algorithm. In one embodiment, the RAN node 110 may be programmed to attempt to satisfy a request for a preferred RACH procedure configuration or type of RACH procedure configuration that is specified by the UE 100 while balancing the service needs of other UEs 100 connected to the RAN node 110. Other considerations taken into account during the selection process may include the type of device, the network services consumed by the UE 100, and so forth.

The plural RACH procedure configurations available for selection may include various types of signaling procedures, such as the different signaling flows for the RACH procedure configurations described in the background section above. For example, one RACH procedure configuration may allow the UE 100 to send msg1 in any one of multiple BWPs and the remaining RACH procedure messages (messages 2 through 4) are sent in the same BWP. In another RACH procedure configuration, the RACH procedure messages sent by the UE 100 are sent in one BWP and the network response messages are send in another of the BWPs. In another RACH procedure configuration, the UE 100 may send the preamble message in multiple BWPs and the remainder of the RACH procedure is carried out in one of the BWPs. In still another RACH procedure configuration, the complete RACH procedure is carried out in two or more BWPs. Other RACH procedure configurations may vary connection settings used by the UE 100. Other RACH procedure configurations may include those that are described below. These examples should not be considered limiting to the possible RACH procedure configurations available for selection by the RAN node 110.

Once the RACH procedure configuration is selected, the RAN node 110 communicates the selected RACH procedure configuration to the UE 100. For example, at step S03, the RAN node 110 transmits a RACH configuration message to the UE 100 and this message is received by the UE 100. The RACH configuration message may be made using RRC signaling.

The RACH configuration message may contain an indicator value of the selected RACH procedure configuration. The UE 100 may store a database of the plural possible RACH procedure configurations and may use the indictor value to retrieve the appropriate configuration data and parameters for the selected RACH procedure configuration. Alternatively, the RACH configuration message may contain the configuration data and parameters for the selected RACH procedure configuration. Until the RACH procedure configuration is reconfigured, the UE 100 may apply the configuration data and parameters for the selected RACH procedure configuration during one or more subsequent RACH procedures carried out between the UE 100 and the RAN node 110.

In one embodiment, the RAN node 110 may self-initiate the selection of a RACH procedure configuration and communicate the selected RACH procedure configuration to the UE 100. For example, the RAN node 110 may carry out steps S02 and S03 without the receipt of a RACH configuration request message. The RAN node 110 may perform these operations if the UE 100 is not configured to send RACH configuration request messages, due to the elapsing of a predetermined amount of time since the last RACH procedure configuration for the UE 100, due to a change in network conditions, or some other factor.

The UE 100 may apply the configuration data and parameters for the selected RACH procedure configuration. Then, the UE 100 may carry out a RACH procedure as appropriate to initiate access with the RAN 106. The term initiate access refers to an individual connection attempt, which is referred to as an "initial access" procedure, even if the UE 100 has been previously connected. Therefore, the term "initiate access" includes a UE 100 resuming connection with the RAN 106.

In an exemplary RACH procedure, the UE 100 may transmit a PRACH preamble message (msg1) to the RAN node 110 in step S04. Also in step S04, the PRACH preamble message is received by the RAN node 110. The RAN node 110 responds by transmitting a RAR message (msg2) to the UE 100 in step S05. Also in step S05, the UE 100 receives the RAR message. Next, the UE 100 transmits an RRC connection request message (msg3) to the RAN node 110 in step S06. Also in step S06, the RRC connection request message is received by the RAN node 110. The RAN node 110 responds by transmitting an RRC connection setup message (msg4) to the UE 100 in step S07. Also in step S07, the RRC connection setup message is received by the UE 100. Thereafter, the UE 100 configures itself in accordance with the RACH procedure and carries out data communications with the RAN node 110. In another embodiment, the UE 100 may combine msg1 and msg3 in one message and the RAN node 110 may combine msg2 and msg4 in one message. Other exemplary RACH procedures that may be carried out using the selected RACH procedure configuration are described below.

Figure 5:
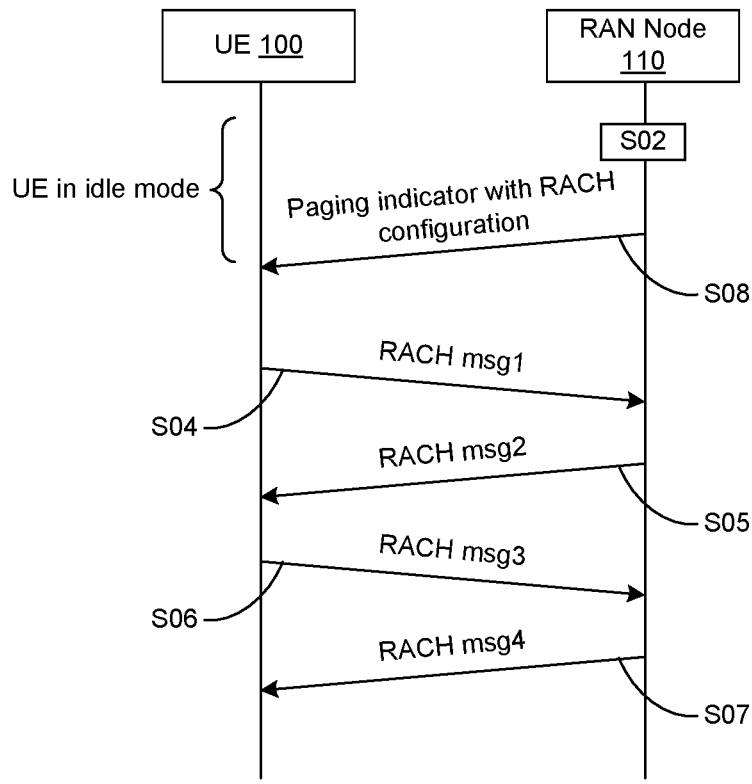
FIG. 5 is a second exemplary message flow diagram for communications between the user equipment and the RAN node.

With additional reference to FIG. 5, shown is another exemplary signaling diagram for messages that are sent between the UE 100 and the RAN node 110 to configure the RACH procedure used by the UE 100 and then to carry out a corresponding RACH procedure. It will be understood that the RACH procedure need not be carried out for the configuration of the RACH procedure to be completed. Also, once the RACH procedure is configured, multiple RACH procedures may be carried out using the RACH procedure configuration before the RACH procedure configuration is changed or the configuration process is repeated.

FIG. 5 may be considered to illustrate an exemplary process flow containing steps that may be collectively carried out by various components of the network 102. FIG. 5 also may be considered to illustrate exemplary process flows that each contain one or more steps carried out by respective individual components of the network 102. Although illustrated in a logical progression, the operations shown in FIG. 5 may be carried out in other orders and/or with concurrence between two or more operations. Therefore, the illustrated flow may be altered (including omitting steps) and/or may be implemented in other manners. The operations carried out by the various devices may be embodied in respective logical routines (e.g., software or lines of code) stored on non-transitory computer readable medium of the appropriate devices.

In the process flow of FIG. 5, the UE 100 may be in idle mode. In this embodiment, the RAN node 110 self-initiates the selection of a RACH procedure configuration in step S02. It is noted that blocks having functionality similar to the functionality of the blocks of FIG. 4 are given the same reference numerals in FIG. 5. The RACH procedure configuration may be selected in the same manner as described above in connection with FIG. 4.

In step S08, the RAN node 110 communicates the selected RACH procedure configuration to the UE 100. For example, RAN node 110 may transmit a paging indicator containing the selected RACH procedure configuration to the UE 100 as system information. Also in step S08, the UE 100 may receive the paging indicator. The selected RACH procedure configuration may be identified in the paging indicator in the same manner as identified in the RACH configuration message of FIG. 4.

In response to the paging indicator, the UE 100 may apply the configuration data and parameters for the selected RACH procedure configuration. Then, the UE 100 may carry out a RACH procedure as appropriate to initiate access with the RAN 106. For instance, steps S04 through S07 may be carried out.

In one embodiment, the page is directed to the UE 100, typically when the UE 100 is in idle mode. In other cases, a page may be sent to a group of UEs 100, all UEs 100 in the cell, or all UEs 100 in the registration area to indicate that there is a system information update that sets out a RACH procedure configuration to be used by the paged UEs 100.

The foregoing approaches allow the possibility of configuring the RACH procedure. A RACH procedure configuration may be selected from multiple RACH procedure configurations, including the possibility of a RACH procedure that uses multiple frequencies (e.g., BWPs). The foregoing approaches include the possibility for the UE 100 to indicate a preferred RACH procedure configuration, and for the RAN 106 to configure the UE 100 with a corresponding configuration (or several configurations). The configuration may be based on the type of UE and/or the service used by the UE 100 to assist in providing a desirable level of latency, reliability, etc.

Random Access Channel Procedure with Early Data Transmission

Under current standards, a small amount of uplink data may be transmitted from the UE 100 to the RAN node 110 in msg3. Similarly, a small amount of downlink data may be transmitted from the RAN node 110 to UE 100 in msg4. These data transmissions are referred to as early data transmission (EDT). The amount of payload data that may be encapsulated into the conventional RACH random access procedure is very limited. To enhance the amount of payload data that may be transmitted as part of EDT, this section of the disclosure document will describe an additional approach to EDT.

The proposed approach takes advantage of available spectrum in a BWP different than the BWP in which one or more of the RACH procedure messages are transmitted. The proposed solution may be considered a frequency domain division (FDD) approach.

Figure 6:
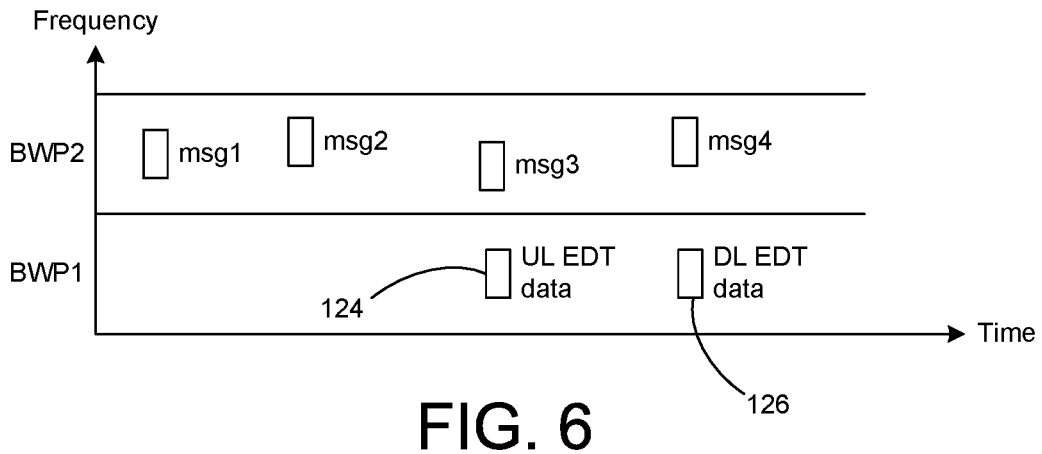
FIG. 6 is a representation of an exemplary random access channel (RACH) procedure with early data transmission using multiple bandwidth parts (BWPs).

Additional details will be described in connection with FIG. 6. FIG. 6 illustrates two BWPs that are available during the RACH procedure. In the illustrated example, the RACH procedure messages are transmitted in one BWP (e.g., the illustrated second BWP or BWP2). It will be appreciated that the RACH procedure may follow any appropriate configuration, including a configuration established in accordance with the foregoing RACH procedure configuration techniques. In another BWP (e.g., the illustrated first BWP or BWP1) that is different than the BWP used for the RACH procedure messages, the UE 100 transmits an early data transmission message 124 containing uplink data to the RAN node 110.

The early data transmission message 214 is transmitted in association with one of the RACH procedure messages. For instance, the early data transmission message 124 is transmitted with at least partial temporal overlap with the associated RACH procedure message. For uplink data, the RACH procedure message associated with the early data transmission message 124 is the RRC connect request, or msg3. If the RRC connect request is combined with the PRACH preamble message (or msg1), then the early data transmission message may be transmitted with at least partial temporal overlap with the combined RACH procedure message. In one embodiment, transmission of the early data transmission message 124 starts before the RAN node 110 responds to the RACH procedure message associated with the early data transmission message 124.

This technique may be adapted for the early data transmission of downlink data from the RAN node 110 to the UE 100. For example, one BWP (e.g., the second BWP in the illustrated embodiment) is used to transmit a RACH procedure message from the RAN node 110 to the UE 100 and another BWP (e.g., the illustrated first BWP) that is different than the BWP used for the RACH procedure message is used to transmit an early data transmission message 126 containing downlink data from the RAN node 110 to the UE 100. The early data transmission message 126 is transmitted in association with one of the RACH procedure messages. For instance, the early data transmission message 126 is transmitted with at least partial temporal overlap with the associated RACH procedure message. For downlink data, the RACH procedure message associated with the early data transmission message 126 is the connection setup message, or msg4. If the connection setup message is combined with the RAR message (or msg2), then the early data transmission message may be transmitted with at least partial temporal overlap with the combined RACH procedure message.

It is contemplated that the payload capacity of the uplink or downlink early data transmission message 124, 126 of the foregoing techniques is larger than the payload capacity of conventional early data transmission techniques where uplink data is attached within msg3 and/or downlink data is attached within msg4.

Figure 7:
FIG. 7 is another representation of a RACH procedure with early data transmission using multiple BWPs.

With additional reference to FIG. 7, another technique for EDT is shown. In this approach, a RACH procedure is carried out in each of two BWPs. For both BWPs, uplink data is included in msg3 transmitted in the first BWP and in msg3 transmitted in the second BWP, thereby increasing the cumulative amount of uplink data transmitted as early data transmission data. This technique may be adapted for the transmission of downlink data by including downlink data in msg4 transmitted in the first BWP and in msg4 transmitted in the second BWP.

In one embodiment, the use of two (or more) RACH procedures in respective BWPs is triggered by determining that data to be transmitted in EDT format data is larger than the data payload of one RACH procedure message but the data will fit into two (or more) RACH procedure message. In this case the data is separated into parts that are transmitted in respective RACH procedure messages for reconstruction by the receiving device.

The signaling may be adapted to facilitate coordinated transmission of the data. Signaling with appropriate pointer values may be used to indicate a logical coupling between the two RACH procedures to so as to indicate that data appended in one RACH procedure has an association with data appended in the other RACH procedure. For instance, for uplink data transmission, the first transmitted msg1 may contain an indicator to the RAN node 110. The indicator may, for example, specify that the current RACH procedure connects to another RACH procedure in another BWP and that EDT data found in ensuring msg3 on the current BWP has an associated part appended in msg3 transmitted on the other BWP. Alternatively, the first transmitted msg3 may indicate that further data is appended in msg3 of a second RACH procedure transmitted on another BWP.

In the case of downlink data transmission, the first transmitted msg2 may contain an indicator to the UE 100. The indicator may, for example, specify that the current RACH procedure connects to another RACH procedure in another BWP and that EDT data found in ensuring msg4 on the current BWP has an associated part appended in msg4 transmitted on the other BWP. Alternatively, the first transmitted msg4 may indicate that further data is appended in msg4 of a second RACH procedure transmitted on another BWP.

Two Step Random Access Channel Procedure

Figure 8:
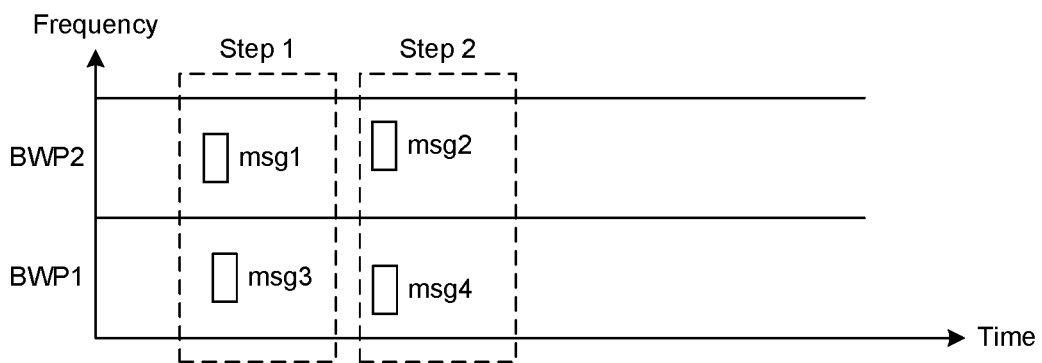
FIG. 8 is a representation of a two-step RACH procedure using multiple BWPs.

With additional reference to FIG. 8, illustrated is a RACH procedure configuration to that compresses the amount of time used to transmit the conventional four RACH procedure messages (msg1 through msg4). In effect, the disclosed approach uses a two-step approach, but all four messages are separately transmitted.

In the illustrated approach, the UE 10 transmits a PRACH preamble message (msg1) to the RAN node 110 over one BWP part (BWP2 in the illustrated embodiment). Prior to a response to the PRACH preamble message being transmitted by the RAN node 110, the UE 100 also transmits an RRC connect request message (msg3). The RRC connect request message is transmitted over a BWP that is different from the BWP used to transmit the PRACH preamble message. In the illustrated embodiment, the RRC connect request message is transmitted over BWP1. In one embodiment, the PRACH preamble message and the RRC connect request message are transmitted by the UE 100 with at least partial temporal overlap. The transmission of the PRACH preamble message and the RRC connect request message by the UE 100 using different bandwidth parts is considered a first step in the RACH procedure.

Upon receipt of the PRACH preamble message and the RRC connect request message from the UE 100, the RAN node 110 responds by transmitting a RACH response (msg2) on one of the first or second BWPs and an RRC connection setup message (msg4) also on one of the first or second BWPs. The RACH response messages transmitted by the RAN node 110 may be transmitted on the same BWP or different BWPs. In the case where the RACH response messages are transmitted on different BWPs, the RACH response and the RRC connection setup message may be transmitted with at least partial temporal overlap. The transmission of the RACH response and the RRC connection setup message by the RAN node 110 using different bandwidth parts is considered a second step in the RACH procedure.

Aspects of the Disclosed Techniques and Devices

The following are various aspects of the disclosure. The aspects are grouped using letters. Within each group, numbers further relate more details of the main aspect of the group.

A1. A method of random access channel (RACH) procedure configuration in a wireless communication network, comprising:

selecting one or more of plural RACH procedure configurations for a radio communication device to employ in order to initiate access with the wireless communication network; and communicating the selected RACH procedure configuration to the radio communication device.

A2. The method of aspect A1, wherein the access to the wireless communication network to which the RACH procedure configuration applies is over unlicensed spectrum.

A3. The method of any of aspects A1-A2, wherein spectrum for which the RACH procedure configuration applies is divided into multiple bandwidth parts over which the radio communication device is configured to communicate.

A4. The method of aspect A3, wherein a RACH procedure configuration is selected and communicated to the radio communication device for each of at least two bandwidth parts.

A5. The method of any of aspects A1-A4, further comprising receiving a RACH procedure message from the radio communication device over a first bandwidth part and receiving an early data transmission message from the radio communication device over a second bandwidth part different from the first bandwidth part, the early data transmission message transmitted in association with the RACH procedure message.

A6. The method of aspect A5, wherein the RACH procedure message and the early data transmission message are received from the radio communication device with at least partial temporal overlap.

A7. The method of any of aspects A1-A6, wherein each RACH procedure configuration specifies a RACH signal flow for the RACH procedure configuration and/or one or more radio access settings that support a level of service for the radio communication device.

A8. The method of any of aspects A1-A7, wherein the selecting is made according to capabilities of the radio communication device.

A9. The method of any of aspects A1-A7, wherein the selecting is made according to a network service used by the radio communication device.

A10. The method of any of aspects A1-A7, further comprising receiving a RACH configuration request for a preferred RACH procedure configuration from the radio communication device, and wherein the selecting and communicating are made in response to the receipt of the RACH configuration request.

A11. The method of aspect A10, wherein the RACH configuration request and communication of the selected RACH procedure configuration are made using radio resource control messages.

A12. The method of any of aspects A1-A7, wherein the selecting and communicating are made by the wireless communication network without request by the radio communication device.

A13. The method of aspect A12, wherein the communication of the selected RACH procedure configuration is made through a radio resource control message.

A14. The method of aspect A12, wherein the communication of the selected RACH procedure configuration is part of a network initiated page to the radio communication device.

A15. The method of any of aspects A1-A14, further comprising receiving a physical random access channel (PRACH) preamble message from the radio communication device over a first bandwidth part and receiving a radio resource control (RRC) connect request message transmitted by the radio communication device over a second bandwidth part different from the first bandwidth part, the PRACH preamble message and the RRC connect request message transmitted by the radio communication device before the wireless communication network responds to the PRACH preamble message.

A16. The method of aspect A15, wherein the PRACH preamble message and the RRC connect request message are transmitted with at least partial temporal overlap.

B1. A method of conducting a random access channel (RACH) procedure in a wireless communication network, comprising:

transmitting a RACH procedure message from one of a radio communication device or a network access node to the other of the radio communication device or the network access node over a first bandwidth part; and transmitting an early data transmission message from the one of the radio communication device or the network access node to the other of the radio communication device or the network access node over a second bandwidth part different from the first bandwidth part, the early data transmission message transmitted in association with the RACH procedure message.

B2. The method of aspect B1, wherein the RACH procedure message is a radio resource control (RRC) connect request transmitted by the radio communication device.

B3. The method of aspect B1, wherein the RACH procedure message is connection setup message transmitted by the network access node.

B4. The method of any of aspects B1-B3, wherein the RACH procedure message and the early data transmission message are transmitted with at least partial temporal overlap.

C1. A method of conducting a random access channel (RACH) procedure in a wireless communication network, comprising:

conducting a first RACH procedure in a first bandwidth part, the conducting of the first RACH procedure including transmitting a message of the first RACH procedure appended with a first portion of early data transmission (EDT) data; and conducting a second RACH procedure in a second bandwidth part different than the first bandwidth part, the conducting of the second RACH procedure including transmitting a message of the second RACH procedure appended with a second portion of the EDT data, the first and second portions of the EDT data being logically associated for reconstruction by a device receiving the corresponding messages of the first and second RACH procedures.

C2. The method of aspect C1, wherein conducting the first and second RACH procedures is triggered by detection of data to send to the receiving device that is larger than an EDT data payload of one RACH procedure message and equal to or smaller than a combined EDT data payload of two RACH procedure messages.

C3. The method of any of aspects C1-C2, wherein signaling of the first RACH procedure indicates the logical association of the first and second portions of the EDT data.

D1. A method of conducting a random access channel (RACH) procedure in a wireless communication network, comprising:

receiving a physical random access channel (PRACH) preamble message from a radio communication device over a first bandwidth part;

prior to responding to the PRACH preamble message, receiving a radio resource control (RRC) connect request message transmitted by the radio communication device over a second bandwidth part different from the first bandwidth part; and responding to the PRACH preamble message and the RRC connect request message by transmitting a RACH response on one of the first or second bandwidth part and an RRC connection setup message on one of the first or second bandwidth part.

D2. The method of aspect D1, wherein the RACH response and the RRC connection setup message are transmitted on different ones of the first and second bandwidth parts.

D3. The method of any of aspects D1-D2, wherein the RACH response and the RRC connection setup message are transmitted with at least partial temporal overlap.

D4. The method of any of aspects D1-D3, wherein the PRACH preamble message and the RRC connect request message are transmitted by the radio communication device with at least partial temporal overlap.

E1. A network access node in a wireless communication network, the network access node configured to configure a random access channel (RACH) procedure for a radio communication device and comprising:

a wireless interface over which communications with the radio communication device are carried out; and a control circuit configured to:

select one or more of plural RACH procedure configurations for the radio communication device to employ in order to initiate access with the wireless communication network; and communicate the selected RACH procedure configuration to the radio communication device using the wireless interface.

E2. The network access node of aspect E1, wherein the access to the wireless communication network to which the RACH procedure configuration applies is over unlicensed spectrum.

E3. The network access node of any of aspects E1-E2, wherein spectrum for which the RACH procedure configuration applies is divided into multiple bandwidth parts over which the radio communication device is configured to communicate.

E4. The network access node of aspect E3, wherein a RACH procedure configuration is selected and communicated to the radio communication device for each of at least two bandwidth parts.

E5. The network access node of any of aspects E1-E4, wherein the network access node is further configured to receive a RACH procedure message from the radio communication device over a first bandwidth part and receive an early data transmission message from the radio communication device over a second bandwidth part different from the first bandwidth part, the early data transmission message transmitted in association with the RACH procedure message.

E6. The network access node of aspect E5, wherein the RACH procedure message and the early data transmission message are received from the radio communication device with at least partial temporal overlap.

E7. The network access node of any of aspects E1-E6, wherein each RACH procedure configuration specifies a RACH signal flow for the RACH procedure configuration and/or one or more radio access settings that support a level of service for the radio communication device.

E8. The network access node of any of aspects E1-E7, wherein the selecting is made according to capabilities of the radio communication device.

E9. The network access node of any of aspects E1-E7, wherein the selecting is made according to a network service used by the radio communication device.

E10. The network access node of any of aspects E1-E7, wherein the network access node receives a RACH configuration request for a preferred RACH procedure configuration from the radio communication device, and wherein the selecting and communicating are made in response to the receipt of the RACH configuration request.

E11. The network access node of aspect E10, wherein the RACH configuration request and communication of the selected RACH procedure configuration are made using radio resource control messages.

E12. The network access node of any of aspects E1-E7, wherein the selecting and communicating are made by the wireless communication network without request by the radio communication device.

E13. The network access node of aspect E12, wherein the communication of the selected RACH procedure configuration is made through a radio resource control message.

E14. The network access node of aspect E12, wherein the communication of the selected RACH procedure configuration is part of a network initiated page to the radio communication device.

E15. The network access node of any of aspects E1-E14, wherein the network access node receives a physical random access channel (PRACH) preamble message from the radio communication device over a first bandwidth part and receives a radio resource control (RRC) connect request message transmitted by the radio communication device over a second bandwidth part different from the first bandwidth part, the PRACH preamble message and the RRC connect request message transmitted by the radio communication device before the network access node responds to the PRACH preamble message.

E16. The network access node of aspect E15, wherein the PRACH preamble message and the RRC connect request message are transmitted with at least partial temporal overlap.

F1. A network access node in a wireless communication network, the network access node comprising:
 a wireless interface over which communications with a radio communication device are carried out; and
 a control circuit configured to control the wireless interface to:
  transmit a RACH procedure message to the radio communication device over a first bandwidth part; and
  transmit an early data transmission message to the radio communication device over a second bandwidth part different from the first bandwidth part, the early data transmission message transmitted in association with the RACH procedure message.

F2. The network access node of aspect F1, wherein the RACH procedure message is connection setup message.

F3. The network access node of any of aspects F1-F2, wherein the RACH procedure message and the early data transmission message are transmitted with at least partial temporal overlap.

G1. A network access node in a wireless communication network, the network access node comprising:
 a wireless interface over which communications with a radio communication device are carried out, including:
  receive a physical random access channel (PRACH) preamble message from the radio communication device over a first bandwidth part; and
  prior to the network access node responding to the PRACH preamble message, receive a radio resource control (RRC) connect request message transmitted by the radio communication device over a second bandwidth part different from the first bandwidth part; and
 a control circuit configured to respond to the PRACH preamble message and the RRC connect request message by controlling the wireless interface to transmit a RACH response on one of the first or second bandwidth part and an RRC connection setup message on one of the first or second bandwidth part.

G2. The network access node of aspect G1, wherein the RACH response and the RRC connection setup message are transmitted on different ones of the first and second bandwidth parts.

G3. The network access node of any of aspects G1-G2, wherein the RACH response and the RRC connection setup message are transmitted with at least partial temporal overlap.

G4. The network access node of any of aspects G1-G3, wherein the PRACH preamble message and the RRC connect request message are transmitted by the radio communication device with at least partial temporal overlap.

H1. A method of random access channel (RACH) procedure configuration in a radio communication device that is configured to communicate with a wireless communication network, comprising:
 transmitting a RACH configuration request for a preferred RACH procedure configuration to a network access node of the wireless communication network;
 receiving a RACH configuration message from the network access node in response to the RACH configuration request, the RACH configuration message containing a RACH procedure configuration selected by the network access node; and
 initiating access with the wireless communication network by transmitting a first RACH procedure message consistent with the RACH procedure configuration to the network access node.

H2. The method of aspect H1, wherein the access to the wireless communication network to which the RACH procedure configuration applies is over unlicensed spectrum.

H3. The method of any of aspects H1-H2, wherein spectrum for which the RACH procedure configuration applies is divided into multiple bandwidth parts over which the radio communication device is configured to communicate.

H4. The method of aspect H3, wherein a RACH procedure configuration is selected and communicated to the radio communication device for each of at least two bandwidth parts.

H5. The method of any of aspects H1-H4, further comprising:
 transmitting a second RACH procedure message over a bandwidth part; and
 transmitting an early data transmission message over another bandwidth part different from the bandwidth part used to transmit the second RACH procedure message, the early data transmission message transmitted in association with the second RACH procedure message.

H6. The method of aspect H5, wherein the second RACH procedure message and the early data transmission message are transmitted by the radio communication device with at least partial temporal overlap.

H7. The method of any of aspects H1-H6, wherein the RACH configuration request is made using a radio resource control message.

H8. The method of any of aspects H1-H7, wherein the first RACH procedure message is a physical random access channel (PRACH) preamble message that is transmitted over a first bandwidth part and the method further comprises transmitting a radio resource control (RRC) connect request message over a second bandwidth part different from the first bandwidth part, the PRACH preamble message and the RRC connect request message transmitted by the radio communication device before the wireless communication network responds to the PRACH preamble message.

H9. The method of aspect H8, wherein the PRACH preamble message and the RRC connect request message are transmitted with at least partial temporal overlap.

I1. A method of conducting a random access channel (RACH) procedure in a radio communication device that is configured to communicate with a wireless communication network, comprising:
 transmitting a physical random access channel (PRACH) preamble message over a first bandwidth part;
 prior to receiving a response to the PRACH preamble message from a network access node, transmitting a radio resource control (RRC) connect request message over a second bandwidth part different from the first bandwidth part; and receiving a RACH response on one of the first or second bandwidth part and an RRC connection setup message on one of the first or second bandwidth part.

I2. The method of aspect I1, wherein the RACH response and the RRC connection setup message are received on different ones of the first and second bandwidth parts.

I3. The method of any of aspects I1-I2, wherein the RACH response and the RRC connection setup message are received with at least partial temporal overlap.

I4. The method of any of aspects I1-I3, wherein the PRACH preamble message and the RRC connect request message are transmitted by the radio communication device with at least partial temporal overlap.

J1. A radio communication device in a wireless communication network that includes a network access node configured to configure a random access channel (RACH) procedure for the radio communication device, the radio communication device comprising:

a wireless interface over which communications with the network access node are carried out; and a control circuit configured to control the wireless interface to:
  transmit a RACH configuration request for a preferred RACH procedure configuration to the network access node;
  receive a RACH configuration message from the network access node in response to the RACH configuration request, the RACH configuration message containing a RACH procedure configuration selected by the network access node; and
  initiate access with the wireless communication network by transmitting a first RACH procedure message consistent with the RACH procedure configuration to the network access node.

J2. The radio communication device of aspect J1, wherein the access to the wireless communication network to which the RACH procedure configuration applies is over unlicensed spectrum.

J3. The radio communication device of any of aspects J1-J2, wherein spectrum for which the RACH procedure configuration applies is divided into multiple bandwidth parts over which the radio communication device is configured to communicate.

J4. The radio communication device of aspect J3, wherein a RACH procedure configuration is selected and communicated to the radio communication device for each of at least two bandwidth parts.

J5. The radio communication device of any of aspects J1-J4, wherein the control circuit is further configured to control the wireless interface to:
  transmit a second RACH procedure message over a bandwidth part; and
  transmit an early data transmission message over another bandwidth part different from the bandwidth part used to transmit the second RACH procedure message, the early data transmission message transmitted in association with the second RACH procedure message.

J6. The radio communication device of aspect J5, wherein the second RACH procedure message and the early data transmission message are transmitted by the radio communication device with at least partial temporal overlap.

J7. The radio communication device of any of aspects J1-J6, wherein the RACH configuration request is made using a radio resource control message.

J8. The radio communication device of any of aspects J1-J7, wherein the first RACH procedure message is a physical random access channel (PRACH) preamble message that is transmitted over a first bandwidth part and the control circuit is further configured to control the wireless interface to transmit a radio resource control (RRC) connect request message over a second bandwidth part different from the first bandwidth part, the PRACH preamble message and the RRC connect request message transmitted by the radio communication device before the wireless communication network responds to the PRACH preamble message.

J9. The radio communication device of aspect J8, wherein the PRACH preamble message and the RRC connect request message are transmitted with at least partial temporal overlap.

K1. A radio communication device in a wireless communication network that includes a network access node, the radio communication device comprising:

a wireless interface over which communications with the network access node are carried out; and a control circuit configured to control the wireless interface to:
  transmit a RACH procedure message from the radio communication device to the network access node over a first bandwidth part; and
  transmit an early data transmission message from the radio communication device to the network access node over a second bandwidth part different from the first bandwidth part, the early data transmission message transmitted in association with the RACH procedure message.

K2. The radio communication device of aspect K1, wherein the RACH procedure message is a radio resource control (RRC) connect request.

K3. The radio communication device of any of aspects K1-K2, wherein the RACH procedure message and the early data transmission message are transmitted with at least partial temporal overlap.

L1. A radio communication device in a wireless communication network that includes a network access node, the radio communication device comprising:

a wireless interface over which communications with the network access node are carried out; and a control circuit configured to control the wireless interface to:
  transmit a physical random access channel (PRACH) preamble message over a first bandwidth part;
  prior to receiving a response to the PRACH preamble message from the network access node, transmit a radio resource control (RRC) connect request message over a second bandwidth part different from the first bandwidth part; and
  receive a RACH response on one of the first or second bandwidth part and an RRC connection setup message on one of the first or second bandwidth part.

L2. The radio communication device of aspect L1, wherein the RACH response and the RRC connection setup message are received on different ones of the first and second bandwidth parts.

L3. The radio communication device of any of aspects L1-L2, wherein the RACH response and the RRC connection setup message are received with at least partial temporal overlap.

L4. The radio communication device of any of aspects L1-L3, wherein the PRACH preamble message and the RRC connect request message are transmitted by the radio communication device with at least partial temporal overlap.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of random access channel (RACH) procedure configuration in a wireless communication network, comprising:
    selecting one of a plurality of RACH procedure configurations for a radio communication device to employ in order to initiate access with the wireless communication network, the plurality of RACH procedure configurations comprises one or more signaling procedures; and
    communicating the selected RACH procedure configuration to the radio communication device.

2. The method of claim 1, wherein the access to the wireless communication network to which the RACH procedure configuration applies is over unlicensed spectrum.

3. The method of claim 1, wherein spectrum for which the RACH procedure configuration applies is divided into multiple bandwidth parts over which the radio communication device is configured to communicate.

4. The method of claim 3, wherein a RACH procedure configuration is selected and communicated to the radio communication device for each of at least two bandwidth parts.

5. The method of claim 1, further comprising receiving a RACH procedure message from the radio communication device over a first bandwidth part and receiving an early data transmission message from the radio communication device over a second bandwidth part different from the first bandwidth part, the early data transmission message transmitted in association with the RACH procedure message.

6. The method of claim 5, wherein the RACH procedure message and the early data transmission message are received from the radio communication device with at least partial temporal overlap.

7. The method of claim 1, wherein each RACH procedure configuration specifies a RACH signal flow for the RACH procedure configuration and/or one or more radio access settings that support a level of service for the radio communication device.

8. The method of claim 1, wherein the selecting is made according to capabilities of the radio communication device.

9. The method of claim 1, wherein the selecting is made according to a network service used by the radio communication device.

10. The method of claim 1, further comprising receiving a RACH configuration request for a preferred RACH procedure configuration from the radio communication device, and wherein the selecting and communicating are made in response to the receipt of the RACH configuration request.

11. The method of claim 10, wherein the RACH configuration request and communication of the selected RACH procedure configuration are made using radio resource control messages.

12. The method of claim 1, wherein the selecting and communicating are made by the wireless communication network without request by the radio communication device.

13. The method of claim 12, wherein the communication of the selected RACH procedure configuration is made through a radio resource control message.

14. The method of claim 12, wherein the communication of the selected RACH procedure configuration is part of a network initiated page to the radio communication device.

15. The method of claim 1, further comprising receiving a physical random access channel (PRACH) preamble message from the radio communication device over a first bandwidth part and receiving a radio resource control (RRC) connect request message transmitted by the radio communication device over a second bandwidth part different from the first bandwidth part, the PRACH preamble message and the RRC connect request message transmitted by the radio communication device before the wireless communication network responds to the PRACH preamble message.

16. The method of claim 15, wherein the PRACH preamble message and the RRC connect request message are transmitted with at least partial temporal overlap.

17. A network access node in a wireless communication network, the network access node configured to configure a random access channel (RACH) procedure for a radio communication device and comprising:
    a wireless interface over which communications with the radio communication device are carried out; and
    a control circuit configured to:
    select one of a plurality of RACH procedure configurations for the radio communication device to employ in order to initiate access with the wireless communication network, the plurality of RACH procedure configurations comprises one or more signaling procedures; and
    communicate the selected RACH procedure configuration to the radio communication device using the wireless interface.

18. A method of random access channel (RACH) procedure configuration in a radio communication device that is configured to communicate with a wireless communication network, comprising:
    selecting a preferred RACH procedure configuration of a plurality of RACH procedure configurations for the radio communication device to employ in order to initiate access with the wireless communication network;
    transmitting a RACH configuration request for comprising the preferred RACH procedure configuration to a network access node of the wireless communication network;
    receiving a RACH configuration message from the network access node in response to the RACH configuration request, the RACH configuration message containing a RACH procedure configuration selected by the network access node, the selected RACH procedure configuration is selected based on the preferred RACH procedure configuration; and
    initiating access with the wireless communication network by transmitting a first RACH procedure message consistent with the selected RACH procedure configuration to the network access node.

* * * * *